US009665176B2

United States Patent
Nakao

(10) Patent No.: US 9,665,176 B2
(45) Date of Patent: May 30, 2017

(54) TACTILE SENSATION PROVIDING DEVICE

(71) Applicant: KYOCERA CORPORATION, Kyoto (JP)

(72) Inventor: Fumiaki Nakao, Kawasaki (JP)

(73) Assignee: KYOCERA Corporation, Kyoto (JP)

( * ) Notice: Subject to any disclaimer, the term of this patent is extended or adjusted under 35 U.S.C. 154(b) by 97 days.

(21) Appl. No.: 14/420,463

(22) PCT Filed: Aug. 7, 2013

(86) PCT No.: PCT/JP2013/004771
§ 371 (c)(1),
(2) Date: Feb. 9, 2015

(87) PCT Pub. No.: WO2014/024486
PCT Pub. Date: Feb. 13, 2014

(65) Prior Publication Data
US 2015/0227201 A1    Aug. 13, 2015

(30) Foreign Application Priority Data

Aug. 9, 2012   (JP) ................................. 2012-177484
Sep. 28, 2012  (JP) ................................. 2012-218454

(51) Int. Cl.
G09G 5/00   (2006.01)
G06F 3/041  (2006.01)
G06F 3/01   (2006.01)

(52) U.S. Cl.
CPC .............. *G06F 3/016* (2013.01); *G06F 3/041* (2013.01)

(58) Field of Classification Search
CPC .................... G06F 3/016; G06F 3/041
(Continued)

(56) References Cited

U.S. PATENT DOCUMENTS 8,593,420 B1 *  11/2013  Buuck ..................... G06F 3/041
                                                       345/173
2007/0080951 A1 *  4/2007  Maruyama ............ G06F 1/1626
                                                       345/173
(Continued)

FOREIGN PATENT DOCUMENTS

JP          H03-266285 A       11/1991
JP          H05-17888 U         3/1993
(Continued)

OTHER PUBLICATIONS

International Search Report; PCT/JP2013/004771; Sep. 10, 2013.
Written Opinion of the International Searching Authority; PCT/JP2013/004771; Sep. 10, 2013; with concise explanation.

*Primary Examiner* — Amit Chatly
(74) *Attorney, Agent, or Firm* — Studebaker & Brackett PC

(57)            ABSTRACT

The tactile sensation providing device has a tactile sensation provider (20, 21, 22) that provides a tactile sensation by vibration and a stretchable/contractible sealing member (52) that seals a space (50) on the opposite side of a tactile sensation providing surface 20a of the tactile sensation provider. The sealing member (52) may stretch/contracts, according to vibration of the tactile sensation provider (20, 21, 22), to approach a state where the atmospheric pressure of the space (50) on the opposite side of the tactile sensation providing surface (20a) and the atmospheric pressure of the space outside the tactile sensation providing device are balanced to each other.

8 Claims, 6 Drawing Sheets

(58) Field of Classification Search
USPC .................................................. 345/156–179
See application file for complete search history.

(56) References Cited

U.S. PATENT DOCUMENTS

2011/0260991 A1   10/2011   Aono
2013/0154988 A1    6/2013   Inoue et al.

FOREIGN PATENT DOCUMENTS

| JP | 2004-362428 A | 12/2004 |
| JP | 2011-034150 A | 2/2011 |
| JP | 2012-048584 A | 3/2012 |

\* cited by examiner

TACTILE SENSATION PROVIDING DEVICE

CROSS-REFERENCE TO RELATED APPLICATION

This application claims priority to and the benefit of Japanese Patent Application No. 2012-177484 filed on Aug. 9, 2012 and Japanese Patent Application No. 2012-218454 filed on Sep. 28, 2012 to claim internal priority of the aforementioned application, the entire contents of which are incorporated herein by reference.

TECHNICAL FIELD

The present invention relates to a tactile sensation providing device that provides a tactile sensation by vibration.

BACKGROUND

In recent years, a tactile sensation providing device that provides a tactile sensation to the operation by the operator is increasingly mounted on the portable information equipment such as smartphones or tablet PCs, various consumer equipment such as household appliances like microwaves, TV sets or lighting appliances, and various industrial devices (factory automation equipment) such as ATMs (Automated Teller Machines), automatic ticket vending machines, automatic vending machines, or the like (see, for example, Patent Literature 1).

CITATION LIST

Patent Literature 1: JP2011034150A

SUMMARY

Technical Problem

It is desired for the above-described tactile sensation providing device to vibrate efficiently a tactile sensation provider that provides a tactile sensation by vibration, in light of low power consumption, for example.

The present invention has been conceived in light of the above circumstances and it is an object thereof to provide a tactile sensation providing device that can vibrate the tactile sensation provider efficiently.

Solution to Problem

The invention of the tactile sensation providing device that achieves the above described object has a tactile sensation provider that provides a tactile sensation by vibration and a stretchable/contractible sealing member that seals a space on the opposite side of a tactile sensation providing surface of the tactile sensation provider.

The sealing member may have elasticity.

The sealing member may have a bellows structure.

The sealing member may stretch/contract according to vibration of the tactile sensation provider.

The sealing member may stretch/contract, according to vibration of the tactile sensation provider, to approach the state where the atmospheric pressure of the space on the opposite side of the tactile sensation providing surface and the atmospheric pressure of a space outside the tactile sensation providing device are balanced to each other.

The tactile sensation providing device has, on the opposite side of the tactile sensation providing surface of the tactile sensation provider, an opening that communicates the space on the opposite side of the tactile sensation providing surface with a space outside the tactile sensation providing device, and the sealing member may be disposed to cover the opening, thereby sealing the space on the opposite side of the tactile sensation providing surface of the tactile sensation provider.

The tactile sensation providing device has an opening on the opposite side of the tactile sensation providing surface of the tactile sensation provider, and as for the sealing member, to cover the opening, one face thereof may be in contact with the space on the opposite side of the tactile sensation providing surface of the tactile sensation provider and the other face thereof may be in contact with the space outside the tactile sensation providing device.

The sealing member may have a dustproof function or a waterproof function.

The tactile sensation providing device may further have an adjuster that adjusts change in the atmospheric pressure in the space on the opposite side of the tactile sensation providing surface, due to vibration of the tactile sensation provider, and adjusts vibration frequency of the tactile sensation provider.

The sealing member may be formed of an elastic member, and the adjuster may adjust the elasticity of the elastic member.

Effect of the Invention

According to the present invention, a tactile sensation providing device that can vibrate a tactile sensation provider efficiently can be provided.

DESCRIPTION OF EMBODIMENTS

Embodiments of the present invention will be described below with reference to the drawings.

(First Embodiment)

Figure 1:
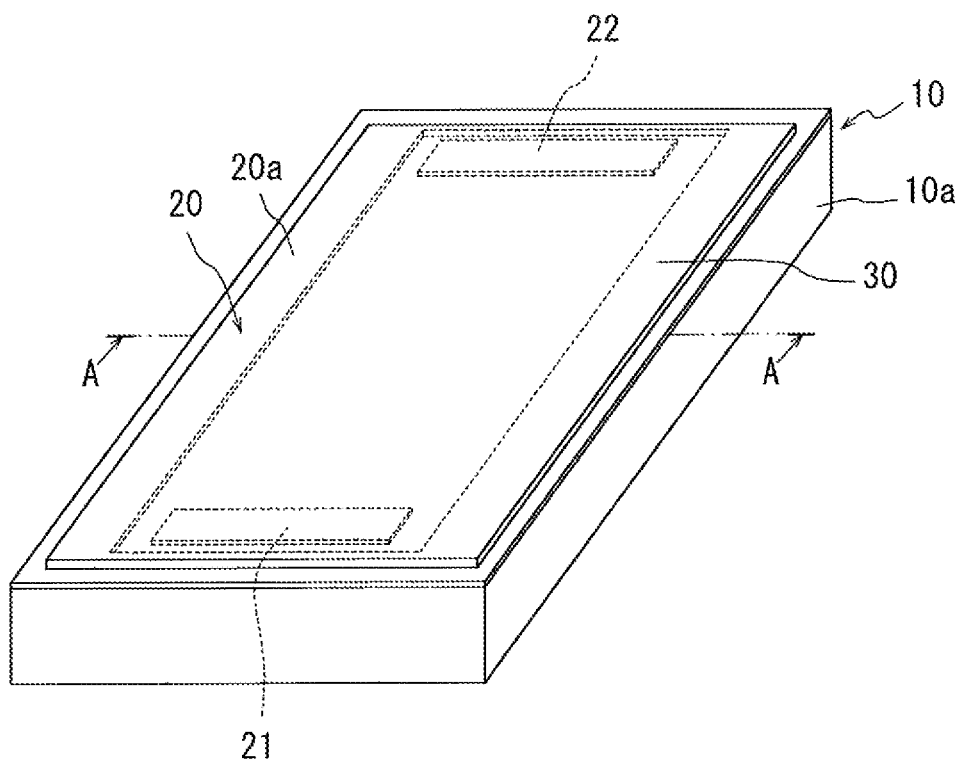
FIG. 1 is an external perspective view illustrating a schematic configuration of a part of a tactile sensation providing device according to a first embodiment.
Figure 2:
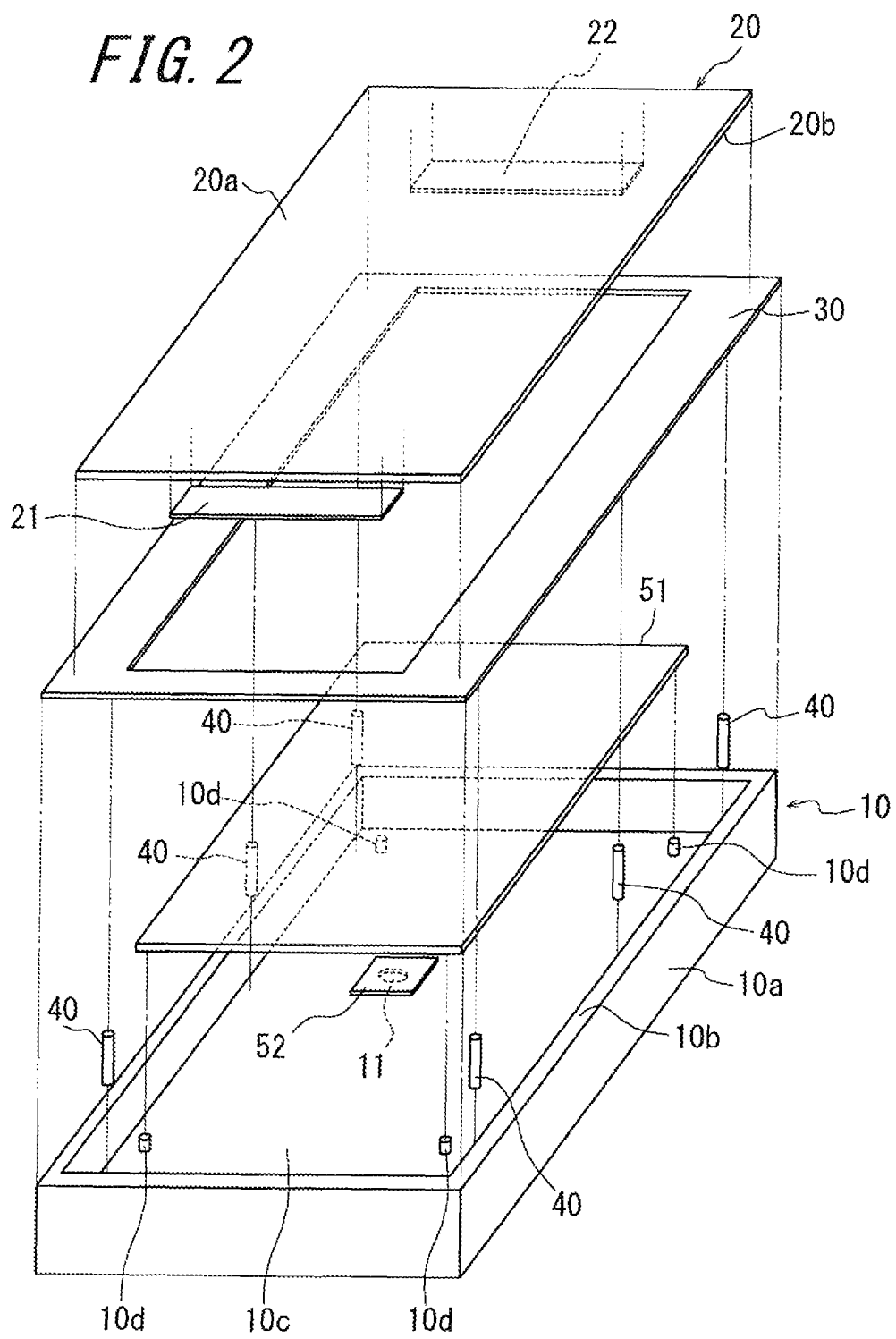
FIG. 2 is an exploded perspective view of FIG. 1.
Figure 3:
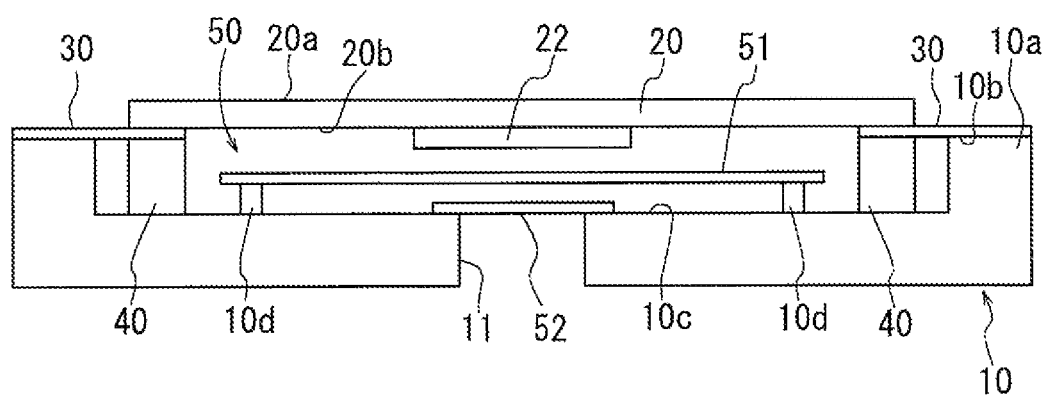
FIG. 3 is an enlarged cross-sectional view along line A-A in FIG. 1.

FIGS. 1 to 3 are diagrams illustrating respectively a part of a tactile sensation providing device according to a first embodiment of the present invention. FIG. 1 is an external perspective view, FIG. 2 is an exploded perspective view and FIG. 3 is an enlarged cross-sectional view along the line A-A in FIG. 1. The tactile sensation providing device according to the present embodiment has a housing 10, a panel 20 and a shielding member 30 in appearance.

The housing 10 is made of, for example, metal, plastic, or resin and is formed in a rectangular shape in plan view. Note that, in this specification, a rectangular shape includes a shape with corners formed in an arc shape. In addition, in the illustrated examples, the housing 10 is illustrated as one housing. However, the housing 10 may be configured by combining an upper housing and a lower housing. In this case, a space between the upper housing and the lower housing is provided with preferable dustproof or waterproof measures by adopting a sealing structure using a rubber packing, for example.

The panel 20 is operated by an operator's finger or a stylus pen, and is formed by, for example, plastic, glass, or the like, with a thickness that allows minimal warping displacement (e.g. tens of µm). Note that the panel 20 may be formed by a touch panel having a publicly known contact detecting function such as, for example, a resistive film type, a capacitive type, and an optical type. Furthermore, in the illustrated example, although the panel 20 is in a rectangular shape in plan view, it may be in a square shape.

For the panel 20, on the panel back 20b which is on the opposite side of the tactile sensation providing surface (operation face) 20a, two piezoelectric elements 21 and 22 are provided to cause the panel 20 to warp and vibrate. The piezoelectric elements 21 and 22 are formed in a long rectangular shape of the same structure, such as a monomorph, a bimorph, a unimorph, or the like, and warp or expand/contract in a longitudinal direction when voltage is applied thereto. One of the piezoelectric elements, which is the piezoelectric element 21, is adhered and fixed to the panel back 20b so that, on one of short sides opposed to each other on the panel back 20b, the longitudinal direction thereof extends along the short side. In the same manner, the other piezoelectric element 22 is adhered and fixed to the panel back 20b so that, on the other side of the short sides on the panel back 20b, the longitudinal direction thereof extends along the short side. The panel 20 and the piezoelectric elements 21 and 22 form a tactile sensation provider.

The shielding member 30 is a sheet-like member provided with, for example, a dustproof function or a waterproof function, and is formed in a frame shape. For the shielding member 30, the inner periphery thereof is adhered to the periphery of the panel back 20b of the panel 20 with double-sided tape or adhesive, or the like, and the outer periphery thereof is adhered to the upper surface 10b of the outer periphery 10a of the housing 10 with double-sided tape or adhesive. In addition, at six locations in total corresponding to the four corners of the panel 20 and the center of each long side of the panel 20, elastically deformable support members 40 are disposed respectively by being adhered with double-sided tape or adhesive between the back of the inner periphery side of the shielding member 30 and the bottom 10c of the housing 10.

As the support member 40, "PORON" (trademark) or the like can be used. Thus, the panel 20 is supported to the bottom 10c of the housing 10 by six support members 40. Therefore, in the illustrated example, with six support members 40, a space (gap) 50 is formed, in the housing 10, between respective back sides of the panel 20 and the shielding member 30 and the bottom 10c of the housing 10. Note that, for the panel 20, the shielding member 30 may be adhered to the periphery of the tactile sensation providing surface 20a, and the support member 40 may be adhered to the panel back 20b. Furthermore, a cylindrical support member 40 is illustrated, however, it may be any shape such as a prism shape.

In the space 50, a circuit board 51 on which a drive circuit, or the like, for the piezoelectric elements 21 and 22 is mounted is supported by the hosing 10 and disposed thereon, separated from the bottom 10c of the housing 10 through the support unit 10d that is integrated into or separated from the housing 10. Note that, in the space 50, as necessary, a display panel such as a liquid crystal panel or the like may be mounted on the panel integrally therein or separately therefrom, or if the tactile sensation providing device is a portable type, a battery may be mounted therein.

A circular opening 11 is formed at the bottom 10c of the housing 10. In a state where an elastic member 52 described later does not cover the opening 11, the space 50 and a space (outside air) outside the tactile sensation providing device are communicated by the opening 11. Any number of openings 11 may be formed on any position including not only the bottom 10c but also the outer periphery 10a, as long as the space 50 communicates with the space outside the tactile sensation providing device. In addition, the opening area of the opening 11 is set preferably depending on the volume of the space 50, the change in the atmospheric pressure in the space 50 due to vibration of the panel 20, the location where the opening 11 is formed and the number thereof, or the like. In the present embodiment, an example where, in the region of the bottom 10c opposite the panel 20, one circular opening 11 is formed on the location corresponding to the center of the panel 20 is illustrated. Note that, the drawing illustrates the opening 11 in an exaggerated manner. In addition, the shape of the opening 11 is not limited to a circular shape, and the opening may be formed in any shape.

The elastic member 52 forms a sealing member, has a dustproof function or a waterproof function, and is disposed at the bottom 10c of the housing 10 to cover (seal) the opening 11 with double-sided tape, adhesive, or the like. As such an elastic member 52, for example, a silicone rubber sheet may be used. The elastic member 52 is in a rectangular shape, for example, and has a thickness of 0.2 mm. Note that, for the elastic member 52, the entire member may be made of a material that has elasticity, or at least a part corresponding to the opening 11 may be made of a material that has elasticity, using a two-color molding method, or the like. The elastic member 52 is disposed to cover the opening 11, thus the space 50 is sealed and entering of dust or water into the space 50 can be prevented. Note that, FIGS. 2 and 3 illustrate an example where the elastic member 52 is mounted on the bottom 10c inside the housing. However, the elastic member 52 may be mounted on the bottom 10c outside the housing or both inside and outside the housing.

The tactile sensation providing device according to the present embodiment detects an operation to the panel 20 and drives the piezoelectric elements 21 and 22. Thus, the panel 20 is caused to warp and vibrate in the direction illustrated by a solid double-headed arrow in FIG. 4, then a tactile sensation is provided to the operator of the panel 20. Note that, in FIG. 4, the panel 20 warps and the tactile sensation providing surface 20a protrudes upward. Here, if the panel 20 has a contact detecting function, the operation to the panel 20 may be detected by the contact detecting function. Furthermore, contact to the panel 20 may be detected by detecting a press by contact to the panel 20. In this case, a press to the panel 20 may be detected by using the piezoelectric elements 21 and 22, or by providing a piezoelectric element or a strain sensor for detecting a press separately.

According to the present embodiment, when the panel 20 vibrates, according to the change in the volume of the space 50 due to vibration, the atmospheric pressure in the space 50 changes. The elastic member 52 stretches/contracts according to the change in the atmospheric pressure in the space 50, and deforms to approach the state where the atmospheric pressure in the space 50 and the outside air pressure (the atmospheric pressure in the space outside the tactile sensation providing device) are balanced to each other. In the present embodiment, when the panel 20 warps and vibrates in the direction indicated by a solid double-headed arrow in FIG. 4, the elastic member 52 may, in conjunction with the warp and vibration of the panel 20, warp and vibrate while stretching/contracting in the direction indicated by a dotted double-headed arrow in FIG. 4. Thus, the change in the atmospheric pressure in the space 50 due to the vibration of the panel 20 is decreased, thereby allowing efficient vibration of the panel 20 by the piezoelectric elements 21 and 22.

Figure 4:
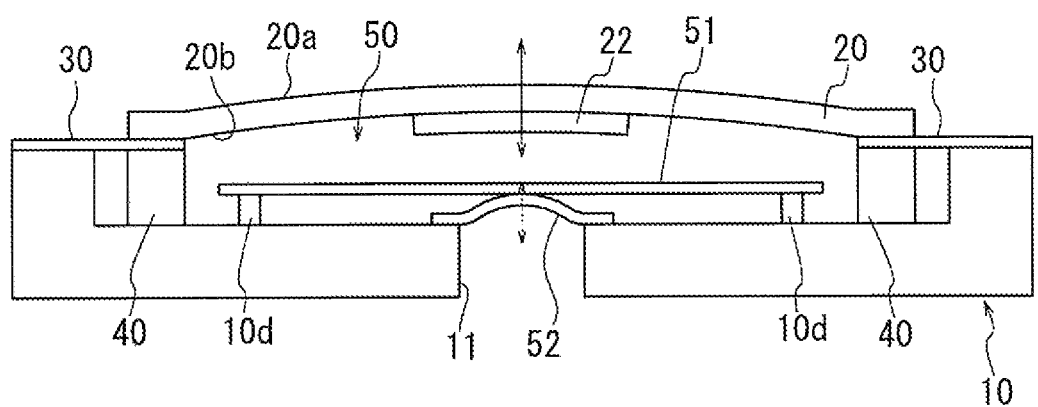
FIG. 4 is a diagram for explaining an operation of the tactile sensation providing device illustrated in FIG. 1.

Note that, in FIG. 4, if the opening 11 is not formed and thus the space 50 is sealed, when the piezoelectric elements 21 and 22 are driven to vibrate the panel 20, the gas (air) in the space 50 may be expanded/compressed according to the vibration. Then, for vibrating the panel 20 with a desired vibration, compared to the present embodiment, a larger driving power would be needed to be supplied to the piezoelectric elements 21 and 22, and the power consumption may be increased. Moreover, in FIG. 4, if the elastic member 52 is not disposed, a sealing property of the space 50 is impaired, and dust and water may enter into the space 50.

(Second Embodiment)

Figure 5:
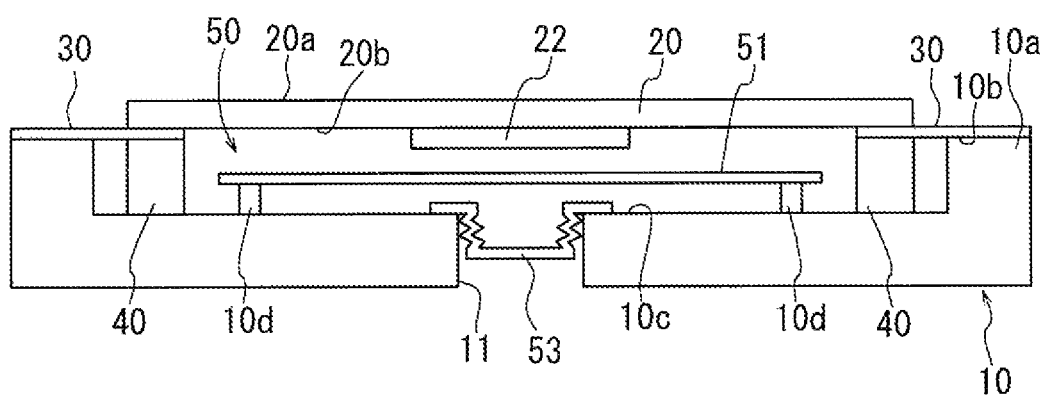
FIG. 5 is an enlarged cross-sectional view illustrating a schematic configuration of a part of a tactile sensation providing device according to a second embodiment.

FIG. 5 is an enlarged cross-sectional view illustrating a schematic configuration of a part of a tactile sensation providing device according to a second embodiment of the present invention. In the configuration of the first embodiment, the tactile sensation providing device according to the present embodiment adopts, instead of the elastic member 52, a bellows-like member 53 as a sealing member, and the opening 11 is sealed thereby. Other than that, the second embodiment has the same structure as that according to the first embodiment. Thus the same reference sign is given to the component that is the same as that of the first embodiment and the explanation thereof is omitted.

For the bellows-like member 53, at least a portion corresponding to the opening 11 has a bellows structure, and it is mounted at the bottom 10c of the housing 10 with double-sided tape, adhesive, or the like, so that it blocks the opening 11. Note that, for the bellows-like member 53, the whole bellow-like member 53 may be formed by a material with no elasticity, or at least a bellows structure portion may be formed by a material with elasticity.

Thus, when the opening 11 is sealed by the bellows-like member 53, the bellows-like member 53 stretches/contracts and vibrates in conjunction with warp and vibration of the panel 20. Thus, the change in the atmospheric pressure in the space 50 due to vibration of the panel 20 is decreased, thereby allowing efficient vibration of the panel 20 by the piezoelectric elements 21 and 22, as in the case of the first embodiment.

(Third Embodiment)

Figure 6:
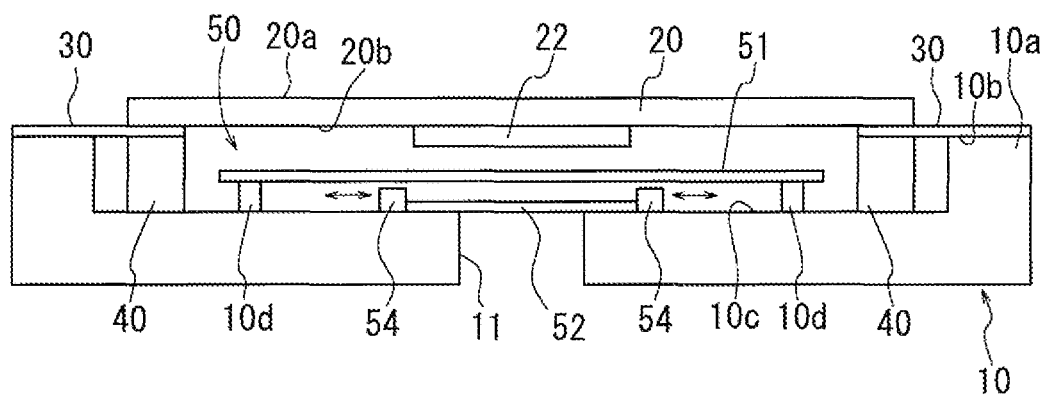
FIG. 6 is an enlarged cross-sectional view illustrating a schematic configuration of a part of a tactile sensation providing device according to a third embodiment.

FIG. 6 is an enlarged cross-sectional view illustrating a schematic configuration of a part of a tactile sensation providing device according to a third embodiment. The tactile sensation providing device according to the present embodiment has, in the configuration of the first embodiment, an adjuster 54 that adjusts the elasticity of the elastic member 52. Other than that, the third embodiment has the same structure as that according to the first embodiment. Thus the same reference sign is given to the component that is the same as that of the first embodiment, and the explanation thereof is omitted.

The adjuster 54 adjusts the tension of the elastic member 52 that seals the opening 11. Thus, the elasticity of the elastic member 52 to the change in the atmospheric pressure in the space 50 when the panel 20 is vibrated is adjusted, and the vibration frequency of the panel 20 is adjusted. That is, the adjuster 54 adjusts the change in the atmospheric pressure in the space due to vibration of the panel 20 by adjusting the elasticity of the elastic member 52, and adjusts the vibration frequency of the panel 20. Note that, the direction of adjusting the tension of the elastic member 52 by the adjuster 54 may be one direction or multiple directions. In the case of multiple directions, an orthogonal direction may preferably be included. In addition, one or more adjusters 54 may be provided with respect to one direction.

With this configuration, the vibration frequency of the panel 20 can be adjusted to the frequency range (e.g. 200 Hz to 300 Hz) preferable for providing a tactile sensation. That is, although the vibration frequency of the panel 20 depends on the drive signal frequency of the piezoelectric elements 21 and 22, it fluctuates from the drive signal frequency depending on the structure of the panel 20 or of the housing 10, air tightness of the space 50, or the like. For that, even if the piezoelectric elements 21 and 22 are driven by the drive signal in the frequency range preferable for providing a tactile sensation, the vibration frequency of the panel 20 may deviate from the frequency range. In this case, for example, the elasticity of the elastic member 52 is adjusted by the adjuster 54 while maintaining the drive signal frequency of the piezoelectric elements 21 and 22, for example, thereby allowing the vibration frequency of the panel 20 to be kept within the preferable frequency range. Thus, a tactile sensation may be provided to the operator reliably without causing an increase in the power consumption, or the like.

Note that the present invention is not limited to the above described embodiments, and a person skilled in the art may make various variations and modifications easily based on the present disclosure. Therefore, note that these variations and modifications are included in the scope of the present invention. For example, the panel 20 may be configured to be vibrated not only by two piezoelectric elements 21 and 22, but also by one or three or more piezoelectric elements. In addition, the panel 20 is not limited to warp vibration, and the surface thereof may be vibrated parallel to the normal line. Moreover, the source of vibration of the panel 20 is not limited to a piezoelectric element, and may be an eccentric motor or an actuator. Furthermore, the elastic member 52 used herein has an area almost the same as the opening area of the opening 11. However, the elastic member is not limited thereto, and may be enough if it has an area that covers the whole surface of the bottom 10c of the housing 10. Such elastic member can stretch/contract more easily, and may further decrease change in the atmospheric pressure in the space 50. Furthermore, in the third embodiment, configuration of the adjuster 54 is not limited to those by which the elasticity of the elastic member 52 is adjusted, and for example, the adjuster 54 may be configured to have a member that can adjust an insertion amount to the space 50 so that the volume of the space 50 is changed to adjust the vibration frequency of the panel 20.

REFERENCE SIGNS LIST

10 Housing
10a Outer periphery
10b Upper face
10c Bottom
10d Support unit
11 Opening
20 Panel
20a Tactile sensation providing surface
20b Panel back 21, 22 Piezoelectric element
30 Shielding member
40 Support member
50 Space
51 Circuit board
52 Elastic member (Sealing member)
53 Bellows-like member (Sealing member)
54 Adjuster

The invention claimed is:

1. A tactile sensation providing device, comprising: a tactile sensation provider that provides a tactile sensation by vibration; a stretchable/contractible sealing member that seals a space on an opposite side of a tactile sensation providing surface of the tactile sensation provider, and an adjuster that adjusts elasticity of the sealing member; wherein the adjuster adjusts change in an atmospheric pressure of the space on the opposite side of the tactile sensation providing surface due to the vibration of the tactile sensation provider, and adjusts vibration frequency of the tactile sensation provider.

2. The tactile sensation providing device according to claim 1, wherein the sealing member has a bellows structure.

3. The tactile sensation providing device according to claim 1, wherein the sealing member stretches/contracts according to the vibration of the tactile sensation provider.

4. The tactile sensation providing device according to claim 1, wherein the sealing member stretches/contracts, according to the vibration of the tactile sensation provider, to approach a state where an atmospheric pressure of the space on the opposite side of the tactile sensation providing surface and an atmospheric pressure of a space outside the tactile sensation providing device are balanced to each other.

5. The tactile sensation providing device according to claim 1, comprising, on the opposite side of the tactile sensation providing surface of the tactile sensation provider, an opening that communicates the space on the opposite side of the tactile sensation providing surface with the space outside the tactile sensation providing device, wherein the sealing member is disposed to cover the opening, sealing the space on the opposite side of the tactile sensation providing surface of the tactile sensation provider.

6. The tactile sensation providing device according to claim 1, comprising an opening on the opposite side of the tactile sensation providing surface of the tactile sensation provider, wherein for the sealing member, to cover the opening, one face thereof is in contact with the space on the opposite side of the tactile sensation providing surface of the tactile sensation provider and the other face thereof is in contact with the space outside the tactile sensation providing device.

7. The tactile sensation providing device according to claim 1, wherein the sealing member has a dustproof function or a waterproof function.

8. The tactile sensation providing device according to claim 1, wherein the sealing member is formed of an elastic member.

* * * * *